United States Patent [19]

Lometillo et al.

[11] 4,394,397

[45] Jul. 19, 1983

[54] PROCESS FOR PRODUCING PASTA PRODUCTS

[75] Inventors: Josephine E. Lometillo, Sepulveda; John M. Wolcott, Burbank, both of Calif.

[73] Assignee: Carnation Company, Los Angeles, Calif.

[21] Appl. No.: 308,071

[22] Filed: Oct. 2, 1981

[51] Int. Cl.$^3$ ............................................... A23L 1/16
[52] U.S. Cl. .................................. 426/557; 426/451; 426/448; 426/662
[58] Field of Search .......... 426/557, 451, 662, 445–450

[56] References Cited

U.S. PATENT DOCUMENTS

| | | | |
|---|---|---|---|
| 3,574,634 | 4/1971 | Singer | 426/557 |
| 3,762,931 | 10/1973 | Craig et al. | 426/557 |
| 3,843,818 | 10/1974 | Wren | 426/557 |
| 4,012,532 | 3/1977 | Moore et al. | 426/451 |
| 4,042,714 | 8/1977 | Torres | 426/557 |
| 4,044,165 | 8/1977 | Baumann | 426/557 |

Primary Examiner—Raymond N. Jones
Assistant Examiner—Elizabeth A. Hatcher

[57] ABSTRACT

A process for producing instant-cooking pasta products such as noodles, spaghetti, macaroni and the like having a porous, cellular structure which enables the products to be rehydrated for consumption within a short period of time, and which exhibit good integrity, firm texture, and desirable flavor upon rehydration. A blend containing a major proportion by weight of a farinaceous starch-containing ingredient, such as semolina, and lesser amounts of gluten, microcrystalline cellulose and an edible vegetable oil is introduced into an extrusion cooker together with a sufficient amount of water to provide an expandable mixture. The mixture is subjected to severe mechanical working at elevated temperatures and pressure to rapidly cook the mixture, causing gelatinization of the starch and thermosetting of the gluten, and is extruded through a plurality of die orifices into the atmosphere. Upon extrusion, the pasta expands forming a pasta product having a porous cellular structure, which is subsequently dried to a maximum moisture content of about 10%. Due to the porous cellular structure of the product, it is readily rehydrated by contact with hot water for a short period of time. Because of the combination of ingredients used, the product, upon rehydration, has good integrity and firm texture without becoming pasty or sticky.

11 Claims, No Drawings

PROCESS FOR PRODUCING PASTA PRODUCTS

BACKGROUND OF THE INVENTION

This invention relates to instant-cooking pasta products, that is, pasta products which may be rehydrated for consumption by contact with hot water for a short period of time, typically within 3 minutes or less. More particularly, the invention relates to a process for producing pasta products having a porous cellular structure which enables the products to be readily rehydrated upon contact with hot water without loss of integrity or firmness.

Conventional pasta products such as noodles, macaroni and spaghetti are prepared by adding water to a starch component such as semolina, farina or flour and kneading the mixture into a homogeneous dough which is then extruded or rolled into the desired shape and dried. Since such products are not cooked during manufacture, in order to prepare the pasta for consumption it must be cooked in boiling water for about 8 minutes or longer in order to fully hydrate and gelatinize the starch therein.

In recent years a number of procedures have been proposed for making quick-cooking pasta products. For example, one type of instant noodles currently marketed is prepared by kneading a mixture of a starch component and water to form a homogeneous dough which is rolled into sheets. The sheets are cut into noodles which are then steamed and fried in hot oil. During deep fat frying, water in the noodles is flashed off, thereby providing the noodles with a porous structure. While this procedure is effective in producing noodles which may be rehydrated for consumption in a short period of time, typically 5 minutes in boiling water, it suffers from the disadvantage that the noodles absorb a considerable amount of oil during the frying step. The noodles thus produced have an undesirably high calorie content and have a propensity for rancid, off-flavor development in storage.

U.S. Pat. No. 4,234,617 discloses the production of instant cooking noddles by including in the dough a hydrolyzate of a starch derived from the root or stalk of a plant having a D.E. of 1-10. In accordance with this procedure the dough is kneaded, rolled into sheets, cut into strips, steamed and dried.

U.S. Pat. No. 4,243,689 discloses a process for producing instant cooking noodles in which a starch-water mixture is formed into a web which is steamed, subjected to preliminary drying to reduce the moisture content of the web to 15–35%, the web is cut into noodles, and the resulting noodles are further dried to reduce their moisture content to below 10%. This final drying step is said to produce a porous texture in the noodles, which enables the noodles to be readily rehydrated.

U.S. Pat. No. 4,271,205 discloses a process for preparing instant cooking noodles in which steamed wet noodles are dried in superheated steam whereby the noodles develop a porous internal structure which enables them to be readily rehydrated.

Other procedures for producing instant cooking noodles are disclosed in U.S. Pat. Nos. 4,044,165 which discloses an extrusion process; 3,615,677; 3,482,993; 3,192,049; and 4,243,690.

While each of these prior art procedures is capable of producing pasta products which can be prepared in consumption in shorter periods of time, these processes suffer from one or more disadvantages which adversely affect their use in commercial production operations and/or the properties of the product upon rehydration.

SUMMARY OF THE INVENTION

The present invention is directed to a process for producing pasta products having an expanded porous cellular structure which enables the pasta to be rehydrated for consumption in a short period of time, with the pasta retaining its integrity and firm texture upon rehydration without becoming pasty. To product the pasta products of this invention, a blend comprising at least 50% by weight of a farinaceous starch-containing material, from about 1% to 26% by weight gluten, about 0.5% to 3.5% by weight of an edible vegetable oil and about 0.25% to 0.75% by weight of a strengthening agent such as microcrystalline cellulose is introduced into an extrusion cooker together with sufficient water, typically from about 15 to 35 percent by weight of the ingredient blend, to plasticize the mix and form a dough. As the dough is carried through the extruder cooker it is subjected to severe mechanical working sufficient to raise its temperature to substantially above 212° F., and to subject the dough to a relatively high pressure, thereby cooking the dough to provide gelatinization of the starch and thermosetting of the gluten cntained therein. The dough is thereafter extruded through a die plate having a plurality of orifices of a desired size, depending on the type of pasta product to be produced.

As the pasta is extruded through an orifice into atmospheric conditions, it expands into a porous, cellular product due to the pressure drop across the die and the flashing off of water as steam. The extruded pasta is then cut to the desired length and dried to a maximum moisture content of about 10%.

Due to the porous, cellular structure of the pasta product thus produced, the pasta is rehydrated for consumption by steeping in hot water for about 3 minutes. However, unlike many of the instant cooking pasta products disclosed in the prior art, the product of this invention, upon rehydration, retains its integrity and firm texture without becoming pasty or sticky. In addition, the present product has a relatively high protein content and contains a low level of fat.

Optional ingredients which may be used in the present invention include a starch complexing agent, such as glyceryl monostearate; a phosphatide, preferably lecithin; a cereal flour having a relatively high oil content; flavoring materials; and vitamins and minerals for nutritional fortification.

DETAILED DESCRIPTION OF THE INVENTION

In accordance with the present invention, the addition of controlled amounts of gluten, vegetable oil and microcrystalline cellulose to a farinaceous starch-containing material provides a mixture which when moistened and subjected to cooking under high temperatures and pressures and extruded will expand to form a porous cellular pasta product capable of being rehydrated for consumption in a very short period of time. Due to the combination of ingredients in the mix being cooked and extruded, the expanded pasta product retains its integrity and firm texture upon rehydration, without becoming sticky or pasty.

The farinaceous starch containing material comprises at least 50% by weight of the ingredient mixture introduced into the extruder cooker, with an amount of at least about 60% by weight of the mix being preferred. The farinaceous material can be a variety of starch-containing materials, such as semolina, durum flour, farina, flour, such as all purpose flour, and combinations thereof. In accordance with a preferred embodiment, the farinaceous material used in the present invention includes a minor amount, generally from about 1% to 10% by weight of the ingredient mixture, of a cereal flour having a relatively high indigenous oil content, such as oat flour, in which the lipid content ranges from 5-10%. The use of such a cereal flour is advantageous in the present invention for it enables the amount of vegetable oil which must be used in the ingredient mix to be minimized.

In order to produce pasta products having the desired combination of characteristics and properties, gluten is incorporated in the ingredient mix introduced into the extrusion cooker, in an amount of from about 1% to 26% by weight of the ingredient mix. The use of gluten, such as wheat gluten, in the ingredient mix is essential to produce pasta products having a porous cellular structure which retains its integrity upon rehydration. Thus, the use of gluten in the ingredient mix provides a mix which when moistened and subjected to mechanical working forms a dough having improved elasticity capable of being expanded into a porous, expanded cellular structure which has sufficient integrity to resist breakdown upon rehydration.

Microcrystalline cellulose is included in the ingredient mix in an amount of at least about 0.25%, and preferably between 0.4%-0.6%, by weight of the ingredient mix. This level of microcrystalline cellulose also serves to improve the integrity of the porous cellular pasta product so as to increase the resistance of the product to breakdown upon rehydration.

The ingredient mix to be cooked and expanded also includes a minor amount of an edible vegetable oil, such as corn oil. The use of a low level of oil, that is no more than about 4% by weight of the ingredient mix, imparts non-sticking properties to the pasta product and prevents the pasta from becoming sticky both upon extrusion and upon rehydration. Preferably the amount of oil included is between about 1 to 3.5% by weight of the ingredient mix. If amounts greater than about 4% are used, difficulty is encountered in developing enough friction in the extrusion cooker to heat the material sufficiently to gelatinize the starch content and coagulate the gluten, so that there is little or no expansion of the extruded material and the product has little integrity.

Optional ingredients which preferably are included in the ingredient mix include a starch complexing agent, a phosphatide, salts, flavorings vitamins, minerals and the like. Starch complexing agents, such as glyceryl monostearate, and mono- and diglycerides, complex the starch released when the ingredient mix is cooked in the extrusion cooker, so that the pasta products produced are firm and non-sticky. Preferably the starch complexing agent is used at a level of about 1%-2% by weight of the ingredient mix. The use of small amounts, that is about 0.1%-0.2%, of a phosphatide, such as lecithin, enhances the firmness of the product, particularly upon rehydration. However, if greater amounts of lecithin are used, that is, 2% or more of the ingredient mix, expansion of the product is adversely affected, and at levels approaching 5%, no expansion occurs.

The dry ingredients used in the ingredient mix should be in particulate form, having a particle size which facilitates uniform mixing and cooking in subsequent processing steps. Typically the dry ingredients are at least 50 mesh in size, preferably between minus 50 mesh and minus 325 mesh in size.

The ingredients are blended and introduced into a conventional extruder-cooker, such as a Wenger X-20 or X-≅extrusion cooker, in which the mixture is subjected to severe mechanical working under high temperatures and pressures to rapidly cook the mixture, and is extruded through a die plate having a plurality of die orifices. Steam and/or hot water are injected into the extrusion cooker with the ingredient mix to increase the temperature of the mix and to raise the moisture content of the mix to between about 15% and 35% and thereby permit plasticization of the mix in the extruder. If the moisture content is too low, the material is susceptible to scorching and jammming in the extruder. If the mixture contains too much moisture, it tends to pass through the extruder with insufficient compression to develop enough heat to gelatinize the starch, coagulate the gluten or develop proper expansion upon extrusion. As the moistened mixture is carried through the extrusion cooker, it is subjected to temperatures substantially above 212° F., typically between about 250° F.-350° F., and a pressure of at least 50 p.s.i. while being subjected to severe mechanical working. These conditions are sufficient to rapidly cook the mix, resulting in gelatinization of the starch and thermosetting of the gluten contained therein.

The cooked material is then forced through a die plate having a plurality of die orifices into a zone of lower pressure, i.e. atmospheric pressure. As the cooked material is extruded through the die orifices, it expands into a porous cellular structure due to the pressure drop across the openings and the flashing off of water contained in the material as steam. The expanded extrudate is then cut at the die face into segments of uniform length by any suitable means, such as by a rotating knife. The expanded product is passed through a conventional hot air dryer to reduce the moisture content of the expanded pasta to no more than about 10%, preferably between to about 3%-8%.

The number, size and shape of the die orifices through which the cooked material is extruded may be varied depending on the type of pasta product to be produced, as is well known in the production of pasta products. Expanded pasta products of the present invention have been produced using die plates having from 50 to 150 openings, with the die orifices having a diameter as small as 0.05 inch and as large as 0.2 inch. Larger or smaller diameter orifices can be used with appropriate adjustment of extruder operating conditions. The product shape and size are determined by the shape and size of the die orifices and the speed of the cutter located at the discharge end of the extruder.

The expanded pasta product thus produced is characterized by a porous, cellular structure which enables the product to be readily hydrated for consumption. Thus, the pasta products of this invention are ready for consumption after about 3 minutes contact with boiling water. Despite their porous structure, the products retain their integrity and firm texture upon hydration, with little or no surface stickiness and negligible breakdown. Instant cooking noodles prepared by the process of the present invention have substantially the same degree of hydration and starch gelatinization as commercially available instant cooking noodles which are produced by a deep fat frying process, but have a substantially higher protein content and have a significantly lower fat content and calorie content than the fried noodles.

The following specific example will illustrate the process of the invention and the product produced thereby.

EXAMPLE

The following ingredients are mixed and blended, the percentages being expressed as the percent by weight of the entire ingredient mix.

| Ingredient | % by Weight |
|---|---|
| Semolina flour | 58.6 |
| Wheat gluten | 24.9 |
| Oat flour | 8.1 |
| Corn oil | 3.2 |
| Glyceryl monostearate | 1.2 |
| Sodium chloride | 1.2 |
| Sodium carbonate | 0.2 |
| Microcrystalline cellulose | 0.2 |
| Lecithin | 0.1 |
| Water | 2.3 |

The ingredient mix is introduced into the hopper of a Wenger X-25 extrusion cooker from where it is fed at a controlled rate into the expander. Hot water at about 200° F., is fed into the high speed mixing cylinder of the expander, at a predetermined rate for admixture with the blend of ingredients flowing into the expander, to adjust the moisture content of the ingredient blend to between about 15%-35%. As the ingredient mix is moved through the extrusion cooker, which is provided with an external steam jacket, it is subjected to severe mechanical working and shear so that the mix is subjected to temperatures of about 225° F.-325° F. and a pressure of at least 50 p.s.i., to rapidly cook the mixture whereby gelatinization of the starch and thermosetting of the gluten occurs. The hot pressurized mixture is extruded through a die plate having approximately 100 die orifices, with each of the orifices having a diameter of about 0.06 inch. As the material issues from the die it expands due to the pressure drop across the die and the flashing off of water as steam, with the diameter of the extruded pasta increasing about 30%-35% as a result of such expansion. The expanded extrudate is then cut into sections of a desired length by means of a rotating knife, and the expanded pieces are dried in a hot air oven to obtain a final moisture content of about 8%.

The dried pasta product thus produced has a porous cellular structure with an internal channel matrix. Tests to determine the degree of starch gelatinization have shown the extruded pasta to contain 15.5% maltose. A quantity of the dried pasta is placed in a container and the pasta covered with boiling water, and left standing therein for 3 minutes. At the end of 3 minutes, the pasta is hydrated sufficiently for consumption, with the pasta having firm texture, no surface stickiness, and negligible breakdown.

According to a preferred embodiment, the dried pasta product of this invention is packed in a thermally insulated cup and other dehydrated ingredients, such as flavors, spices, soup base, and the like, are added, to produce a pasta based snack product. The container is filled with hot water and steeped for 3 minutes to obtain reconstituted noodles having a texture and palatability similar to that of cooked conventional noodles.

What is claimed is:

1. A process of producing instant cooking pasta products having a porous, cellular structure which consists essentially of forming a particulate mixture containing a major proportion by weight of a farinaceous starch-containing material, from 1% to 26% by weight of gluten, from 0.25% to 0.75% by weight of microcrystalline cellulose, between 1% to 3.5% by weight of an edible vegetable oil, and from 0%-less than 2% of a phosphatide, introducing the particulate mixture into an extrusion cooker together with an amount of water sufficient to provide an expandable mixture capable of being carried through the extrusion cooker, subjecting said expandable mixture to severe mechanical working under temperatures sufficiently high to cook the mixture, thereby gelatinizing the starch and thermosetting the gluten contained therein, and pressure sufficiently high that the pressure drop across the die orifice will result in flashing off of water in the mixture as steam, extruding the hot, pressurized mixture through a plurality of die orifices into atmospheric conditions, thereby expanding the cooked material by flashing of contained water to steam, and drying the extruded product to a maximum moisture content of about 10%, thereby producing an expanded product having a porous cellular structure which may be hydrated for consumption by contact with hot water for a short period of time and which upon hydration has a firm texture and good integrity without becoming pasty or sticky.

2. The process defined in claim 1 in which the farinaceous material is selected from the group consisting of semolina, durum flour, farina flour, and combinations thereof, with the farinaceous material comprising about 60% by weight of the particulate mixture.

3. The process defined in claim 2 in which the farinaceous material includes from 1% to 10% of a cereal flour having an indigeneous oil content of more than 5%.

4. The process defined in claim 3 in which the cereal flour is oat flour.

5. The process defined in claim 1 in which the particulate mixture contains between 0.4% to 0.6% by weight of microcrystalline cellulose.

6. The process defined in claim 1 in which the edible vegetable oil is corn oil.

7. The process defined in claim 1 in which the particulate mixture contains from about 1% to 2% of a starch complexing agent.

8. The process defined in claim 7 in which the starch complexing agent is selected from the group consisting of glyceryl monostearate and mono- and diglycerides.

9. The process defined in claim 1 in which the phosphatide is lecithin which is present in an amount of about 0.1%-0.2% by weight.

10. The process defined in claim 1 in which the amount of water is sufficient to provide the particulate mixture with a moisture content of about 15% to 35%.

11. The process defined in claim 1 in which the hot pressurized mixture is extruded through a die plate having from 50 to 150 orifices, with the orifices having a diameter of between 0.05 and 0.2 inch.

* * * * *